Feb. 20, 1951 M. HANDSCHIN 2,542,192
DEVICE FOR THE REMOTE CONTROL
OF ELECTRICAL CIRCUITS
Filed Feb. 27, 1948
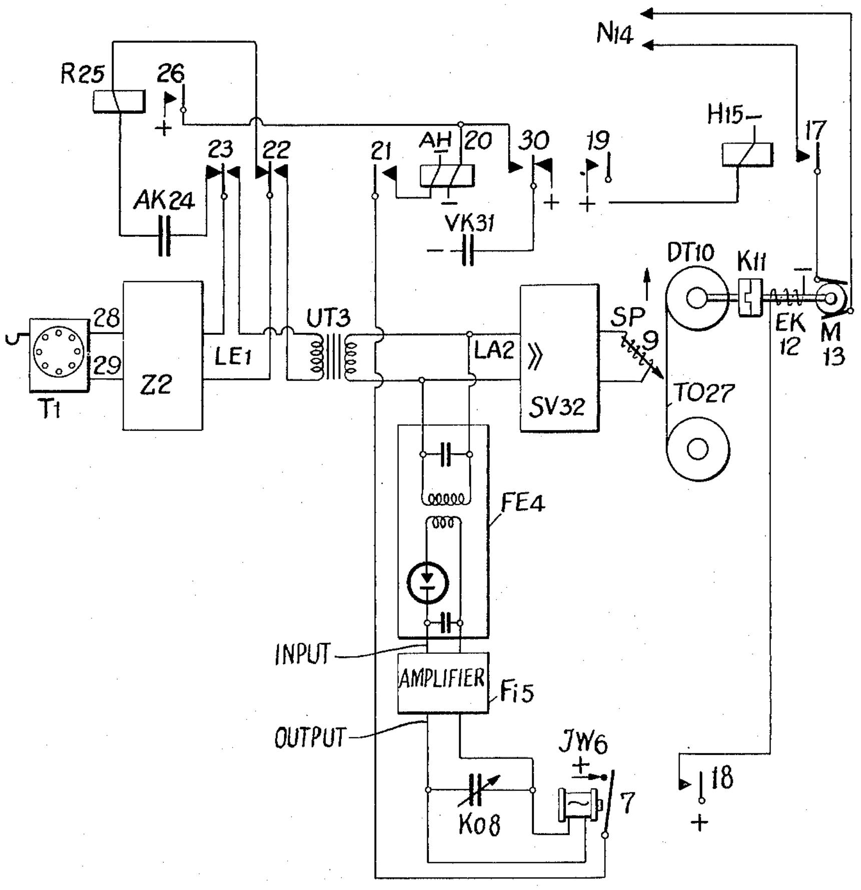
*INVENTOR*
*MAX HANDSCHIN,*
BY *Singer, Ehlert, Stern & Carlberg*
*ATTORNEYS*

Patented Feb. 20, 1951

2,542,192

UNITED STATES PATENT OFFICE 2,542,192

DEVICE FOR THE REMOTE CONTROL OF ELECTRICAL CIRCUITS

Max Handschin, Kusnacht, Switzerland, assignor to Daphne Investment Trust, Vaduz, Liechtenstein Application February 27, 1948, Serial No. 11,817
In Switzerland July 30, 1947

4 Claims. (Cl. 179—6)

The invention relates to an apparatus for the remote control of electrical operations, in particular, in connection with tele-phonographs.

There exists known devices such as, e. g. for switching off tele-phonographs by means of impulses, or series of impulses, of definite duration. However, they possess the disadvantage that it is possible for interference noises to initiate the electrical operation. Such interference noises in the case of transmission over telephone lines would be, for example, buzzer noises, busy signals, etc. Any failure, for example of the switching-off of tele-phonographs is, of course, undesirable inasmuch as the process of recording is then continued whereby the remaining space available for recording useful messages is reduced correspondingly.

The present invention has as one of its objects to eliminate the disadvantages referred to by providing means for filtering out all frequencies outside a predetermined frequency band. This frequency band is, of course, selected so that the frequencies employed for the reproduction of human speech are not filtered out at the same time. An apparatus of that design can easily be adjusted in such a manner that the electrical operation, for example the switching off, takes place immediately upon conclusion of the spoken message, in spite of the presence of interference noises.

The attached schematic diagram of a preferred form of embodiment will serve to illustrate the subject of the present invention in connection with a tele-phonograph of conventional construction.

Referring to the drawings, it is to be understood that the lines provided with a positive symbol (+) are connected to the positive terminals of a battery (not shown) and that this positive terminal of the battery is grounded, while all of the lines provided with a negative symbol (—) are connected to the negative terminal of the battery.

It is assumed that the subscriber T1 is connected in conventional manner with the central station Z2 which latter has in turn connected thereto a telephonograph, the principal elements of the latter are represented by the sound head SP9, the record wire TO29 and the wire spool DT10 driven by the electric motor M13 by means of an electric clutch K11 when the clutch winding EK12 is energised. These elements of the telephonograph are of conventional construction and the following description of its operation by a subscriber is not claimed as new in the present invention.

When the subscriber T1 calls the telephonograph with the assistance of the central station Z2, the relay R25 is energized by the calling current because the following circuit will be established:

(1) Subscriber T1, line 28, central station Z2, contact 23, condenser AK24, relay R25, wind up coil, contact 22, central station Z2, line 2, subscriber T1.

Owing to the excitation of the relay R25 by the calling current of the central station Z2 the relay AH20 will be energised by the following circuit:

(2) Ground (+), contact 26, relay AH20, wind up coil, battery (—).

The contact 30 connects the condenser VK31, which normally is charged, with the wind up coil of the relay AH20 and the condenser VK31 is discharged by the circuit:

(3) Battery (—), VK31, contact 30, relay AH20, wind up coil, battery (—).

The contacts 22 and 23 are reversed and the subscriber T1 and the central station Z2 respectively, are now connected to the coupling transformer UT3 in the transmission line and the following circuit is established:

(4) Subscriber T1, line 28, central station Z2, contact 23, coupling transformer UT3, contact 22, central station Z2, line 29, subscriber T1.

It will be obvious from the above that circuit (1) will be opened and that circuit (3) will temporarily hold the relay AH20 energized. The energisation of relay AH20 causes also an energization of the relay H15 by the following circuit:

(5) Ground (+), contact 19, relay H15, battery (—). The relay H15 thus energized closes the contact 17 and now the motor M13 is set in operation owing to the closing of the following circuit:

(6) Mains 14, contact 17, motor M13, mains 14. Although the motor M13 rotates now the record wire spool DT10 is not as yet driven by the motor M13, because the winding EK12 of the electromechanical clutch K11 is not energized. When now the subscriber T1 begins to talk the relay JW6 will become energized. The winding of the coupling transformer UT3 which is arranged in the subscriber's circuit receives current from the circuit (4). The relay JW6 is energized by the following circuit which forms the most important feature of the invention:

(7) Coupling transformer UT3, filter FE4, amplifier Fi5, relay JW6, amplifier Fi5, filter FE4, coupling transformer UT3.

The sound head amplifier SV32 is arranged in conventional manner parallel to the coupling transformer UT3 with the sound head SP9 in the following circuit:

(8) Coupling transformer UT3, sound head amplifier SV32, sound head SP9, sound head amplifier SV32, coupling transformer UT3.

The circuit (7) constitutes the improvement forming the object of the present invention and will be closed as soon as the subscriber T1 has spoken the first word and the relay JW6 closes both its contacts 7 and 18 and relay AH20 will now receive current for holding its contacts attracted from the following circuit:

(9) Ground (+), contact 7, contact 21, relay AH20, holding coil, battery (—).

The action-delay condenser VK31 may be selected to have such a capacity that it may hold the relay AH20 for instance a time period of five seconds. If after an elapse of this time period the subscriber T1 should fail to produce any speaking sounds, i. e. no vocals nor consonants, then the relay AH20 becomes deenergized circuit (3) and the circuits (5) and (6) also will be opened. The device, namely the telephonograph returns now to its initial or rest position.

The clutch winding EK12 is energized by the following circuit:

(10) Ground (+), contact 18, winding EK12 battery (—).

The record wire spool DT10 is now rotated in conventional manner by the motor M13 as soon as the clutch K11 is engaged and the record wire or sound carrier TO27 moves in the direction of the arrow. The words spoken by the subscriber T1 are recorded upon the wire TO27 in well known manner. Preferably, a condenser Ko 8 may be shunted across the terminals of the winding of the relay JW6, so as to hold the contacts 7 and 18 attracted during the intermissions in the human speaking voice, for instance during intermissions of about 5 seconds.

When the subscriber T1 has finished speaking his message and assuming according to the above example that a five second holding period is provided the condenser Ko8 upon its discharge five seconds after the end of the message causes the relay JW6 to drop its armature and thereby the circuit (7) is opened and at the same time the circuits (4), (5), (6), (8), (9) and (10) are opened and the telephonograph is again connected with the call relay R25. The connection with the central station Z2 is blocked for direct current owing to the arrangement of the condenser AK24.

If interference impulses, e. g. a busy signal of 500 cycles, occur either in line LE1 or in line LA2, the said interference impulses will be blocked by filter FE4 and hence the relay JW6 will not be excited. On the other hand, however, if either LE1 or LA2 are used to transmit human speech the filter FE4 will pass those frequencies which, amplified in the usual manner by means of the amplifier F15, will excite relay JW6. Contacts 7 and 18 will thereby be closed and hence the circuits (9) and (10) will be energized.

Therefore, these interference noises will not be recorded on the record wire TO27, except during the short interval the armature of the relay JW6 is kept attracted, for instance five seconds, after the end of the message, and as a result, it will be possible to use the available length of the record wire for recording longer or additional useful messages.

What I claim as my invention and desire to secure by Letters Patent is:

1. In a telephonograph having a movable sound record, a coupling transformer having a primary coil connected to a telephone circuit and a secondary coil connected to said telephonograph, the improvement comprising means including a frequency filter connected in shunt to the secondary coil of said coupling transformer, said frequency filter including means to pass frequencies in the audible frequency band only and to suppress any other frequencies, means including an amplifier in series with said frequency filter, and a relay having an energizing coil and an armature-contact controlled by the said coil, means connecting said coil in series with said amplifier, and means connecting said armature contact in a circuit provided for initiating and terminating the movement of the sound record of said telephonograph.

2. A telephonograph as claimed in claim 1 in which said relay is a delayed action relay.

3. A telephonograph as claimed in claim 1, including an adjustable condenser and means connecting the same in shunt across the coil of the relay.

4. A telephonograph as claimed in claim 1, in which said frequency filter includes a primary coil and a secondary coil, means including a condenser shunted across the last mentioned secondary coil, a half-wave rectifier valve in series with the last mentioned secondary coil, and means including another condenser shunted across the two output leads of said filter; a valve amplifier having its input connected to said output leads, means including a delayed action relay having a coil connected with the output of said amplifier to be energized thereby, and means including a condenser shunted across said coil for delaying the action of the contact controlling the circuit provided for initiating and terminating the movement of said sound record.

MAX HANDSCHIN.

REFERENCES CITED

The following references are of record in the file of this patent:

UNITED STATES PATENTS

| Number | Name | Date |
|---|---|---|
| 1,726 947 | Chauvean | Sept. 3, 1929 |
| 1,952,578 | Bjornson | Mar. 27, 1934 |
| 2,005,788 | Keiser | June 25, 1935 |
| 2,006,455 | Hickman | July 2, 1935 |
| 2,326,457 | Hadfield | Aug. 10, 1943 |